United States Patent [19]

Matsumoto et al.

[11] Patent Number: 4,731,651

[45] Date of Patent: Mar. 15, 1988

[54] APPARATUS FOR COMPENSATING A MOVEMENT OF A PICTURE OF TELEVISION SIGNAL

[75] Inventors: Kunio Matsumoto; Akira Furutani, both of Kanagawa; Yutaka Tanaka; Toshiro Ohmura, both of Tokyo; Taiichiro Kurita; Yoshimichi Ohtsuka, both of Kanagawa; Taiji Nishizawa, Tokyo; Yuichi Ninomiya, Kanagawa, all of Japan

[73] Assignee: Sony Corporation, Tokyo, Japan

[21] Appl. No.: 889,226

[22] Filed: Jul. 25, 1986

[30] Foreign Application Priority Data

Jul. 26, 1985 [JP] Japan ................... 60-165075

[51] Int. Cl.4 .................. H04N 7/01; H04N 7/12
[52] U.S. Cl. ..................... 358/140; 358/136; 358/105; 358/12
[58] Field of Search ............ 358/31, 105, 136, 140, 358/11, 12

[56] References Cited

U.S. PATENT DOCUMENTS 4,272,787  6/1981  Michael et al. .................. 358/105
4,663,665  5/1987  Tanaka et al. .................... 358/140
4,668,987  5/1987  Matsuda et al. .................. 358/136

*Primary Examiner*—James J. Groody
*Assistant Examiner*—Michael D. Parker
*Attorney, Agent, or Firm*—Lewis H. Eslinger; Alvin Sinderbrand

[57] ABSTRACT

Image movement correction is provided in a field conversion television system by deriving simultaneously two fields of a selected number of lines from an original single field and vertically shifting one of the derived fields by 0.5 lines. A movement vector is determined for each field and movement correction is performed based on a current field and a preceding field, in the case of a moving object in the image. If no moving object is present linear approximation is employed to correct for motion caused by the field number conversion. Two memory systems are provided for the two simultaneous fields and also to selectively obtain specific horizontal lines of the current and preceding fields, relative to both simultaneous derived fields. Ultimate selection of a field for display is based upon the detected movement vector.

14 Claims, 10 Drawing Figures

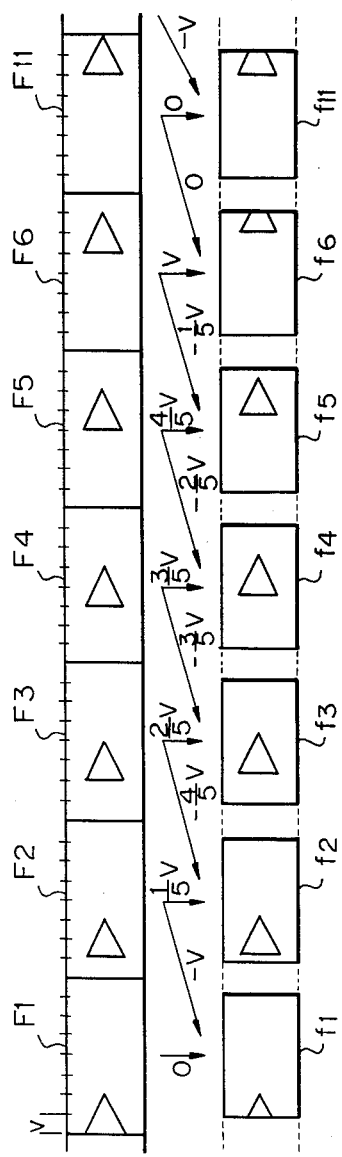
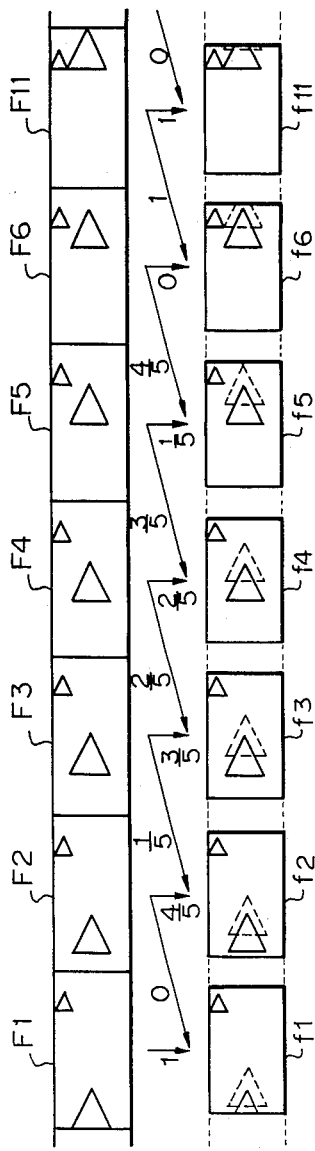
Fig. 3
Fig. 4

APPARATUS FOR COMPENSATING A MOVEMENT OF A PICTURE OF TELEVISION SIGNAL

BACKGROUND OF THE INVENTION

1. FIELD OF THE INVENTION

This invention relates generally to apparatus for converting television signals from one system to another and, more particularly, to apparatus for correcting the movement of a television image which is present in a field number conversion system.

2. DESCRIPTION OF THE BACKGROUND

Systems for converting from the NTSC system to the PAL system, or vice versa, are now known and an example of one such system is Japanese Patent Publication No. 48166/1972. Nevertheless, no consideration is made to correcting any movement errors of the image in such field conversion system. On the other hand, the technology for obtaining an interpolated image using the representative movement vector has been set forth in Japanese Patent Publication No. 28392/1985. Furthermore, a field conversion system for converting from a high definition television (HDTV) system having 1125 lines, 60 fields to the NTSC system having 525 lines, 60 fields has been disclosed, for example, in Japanese Patent Publication No. 104866/1984.

In the case of field number conversion systems, some consideration should be given to image movement, for instance, in the case of converting from sixty fields to fifty fields, movement commands are formed by respectively multiplying the derived movement vector by the coefficients of 1/5, 2/5, 3/5, 4/5, and 1. The movement vector is typically derived in the form of x samples, y lines, where x and y are integers, and the input image is shifted in response to these scaled movement commands, thereby forming more accurately positioned output images. Generally the movement commands in both the horizontal and vertical directions are rounded to the nearest whole number, for example, by counting fractions over one-half as one and discarding anything less than one-half. Thus, it is known to shift the input image by x samples, y lines in response to movement commands when performing field number conversion.

It has also been found that as the unit amount of movement correction is reduced, the accuracy of the movement correction can be increased. Nevertheless, the accuracy in the vertical direction of conventional movement correcting apparatus can not exceed one line.

OBJECT AND SUMMARY OF THE INVENTION

Accordingly, it is an object of the present invention to provide apparatus for correcting the movement of a television image, in which the accuracy of the movement correction in the vertical direction is improved 1.5 to 2 times relative to that provided by conventional apparatus for providing movement correction in a field conversion system.

In accordance with an aspect of the present invention movement correcting apparatus for shifting a television image is provided in which a movement command is formed based upon a movement vector derived from the input image, and an output is then formed that is image shifted by this movement command. In producing this movement command the present invention uses an image of the first field of the input image and an image of the second field of the input signal that are derived from the same field and made to simultaneously exist. Using this special movement command permits the image shifting operation to shift the image 0.5 line in the vertical direction, thereby improving the accuracy of the movement correction in the vertical direction.

The above and other objects, features, and advantages of the present invention will be more apparent from the following detailed description to be read in conjunction with the accompanying drawings, in which like reference numerals represent the same or similar elements.

BRIEF DESCRIPTION OF THE DRAWINGS

FIG. 3 is a diagrammatic representation of a sequence of television fields useful for explaining a movement correcting operation used when performing television system conversion;

FIG. 4 is a diagrammatic representation of a sequence of television fields useful for explaining a linear approximating operation used when performing television system conversion;

DETAILED DESCRIPTION OF PREFERRED EMBODIMENTS

Figure 1:
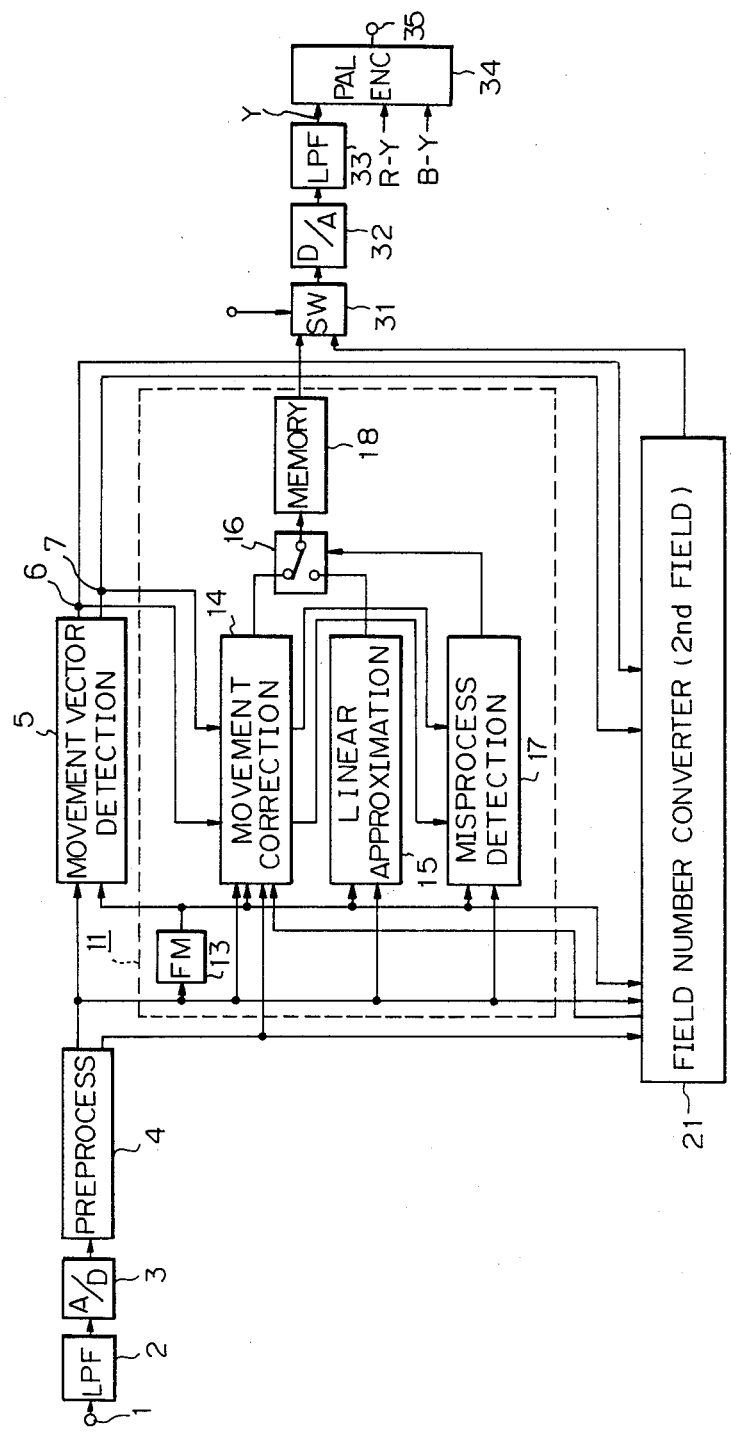
FIG. 1 is a schematic in block diagram form of a television system converting apparatus to which the present invention can be applied.

The present invention is intended for use in a field number conversion system, such as one that converts an NTSC television signal for display on a PAL television. In addition, the present invention is particularly adapted for the case of converting a high definition television (HDTV) signal of 1125 lines, 60 fields into a PAL signal of 625 lines, 50 fields. FIG. 1 is a schematic of a system suitable for use in performing such conversion of an HDTV signal for display on a PAL television set.

In FIG. 1, a luminance component of a high definition television signal (HDTV) is supplied at input terminal 1 and fed to an analog-to-digital (A/D) converter 3 through a low-pass filter (LPF) 2. The digitized luminance signal from A/D converter 3 is fed to a preprocessing circuit 4 that converts the HDTV signal into a signal having the number of lines suitable for the PAL system and executes a noninterlacing process, as will be explained hereinafter.

More particularly, in the preprocessor 4, the number of lines in the HDTV signal is converted from 1125 to 625 by use of a digital frequency converting technique, for example. In the preprocessor, video images formed as first and second fields, each consisting of 625 lines, are simultaneously formed from a video image that was formed as one field of the high definition television signal. These two field images are identical and, thus, are seen to be noninterlaced. Accordingly, although referred to as fields they could also be accurately referred to as frames. Although the first and second fields are essentially identical, there is an offset of 0.5 line in the vertical direction between the respective video images of the first and second fields. Therefore, a digital video signal consisting of only a first field of 625 lines, 60 frames and a digital video signal consisting of only a second field of 625 lines, 60 frames are simultaneously produced as outputs by preprocessing circuit 4.

Figure 2A:
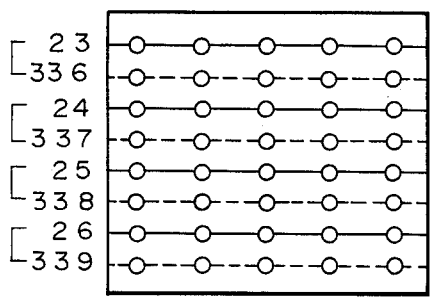
FIGS. 2A, 2B, and 2C are diagrammatic representations of television fields useful for explaining the processing of an input signal in the television system converting apparatus of FIG. 1.
Figure 2B:
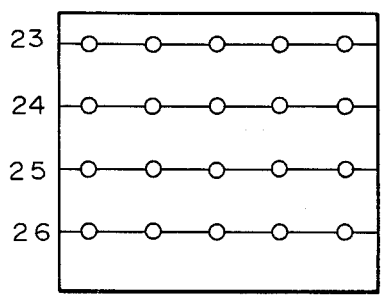
Figure 2C:
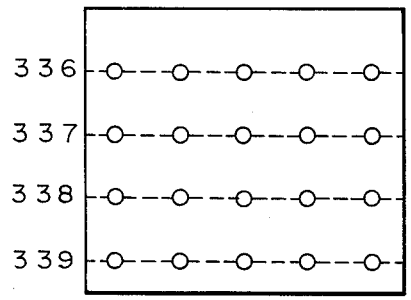

FIG. 2A represents a video field showing the scanning lines after the line number conversion has been performed by the preprocessing circuit 4 of FIG. 1. In FIG. 2A the circles represent pixels that make up the image and the solid lines represent the first field and the broken lines represent the second field. The data of the first field is shown in FIG. 2B and the data of the second field is shown in FIG. 2C, and these two fields are simultaneously, respectively output on the two output lines from the preprocessing circuit 4. More particularly, a pair of lines such as, for example, the 23rd line of the first field and the 336th line of the second field are simultaneously output. Similarly, a pair of lines such as the 24th and 337th lines, a pair of lines such as the 25th and 338th lines, a pair of lines such as the 26th and 339th lines, and so on, are simultaneously output.

As shown in FIGS. 2A, 2B, and 2C, the image of the second field (FIG. 2C) is lower by one line than the image of the first field (FIG. 2B), although these fields are substantially identical because they are both taken from the same HDTV field. Stated another way, the image of the first field is one line above the image of the second field. By use of this relationship, and following the teaching of the present invention as described hereinafter, the image can be shifted vertically by 0.5 line by utilizing the signals of the other fields.

The movement vector is detected using the video signal of the first field and the field number converting process is carried out for each of the first and second fields. By executing the noninterlacing process in preprocessing circuit 4, which results in the two identical and simultaneously produced fields described above, the movement vector is detected at every 1/60 second, so that the detecting accuracy can be improved and the interpolation signal can be easily formed.

Referring back to FIG. 1, a movement vector detection processing circuit 5 receives the digital video signal of the first field from the preprocessing circuit 4. A first field number converter 11, shown within the broken line, operates on the first field, and a second field number converter 21, which is the same as the first field number converter 11, operates on the second field. Image shift commands derived from the detected movement vectors are supplied to the converters 11 and 21 from the movement vector processing circuit 5.

Movement vector processing circuit 5 calculates field difference data, which is the difference between the representative point of the preceding field for every detection region and the pixel of the current field, collects the absolute values of these field difference data, generates the field difference total data, and detects the minimum value of the field difference total data.

The digital video signal of the first field of 625 lines, 50 frames is output from the first converter 11 and the digital video signal of the second field of 625 lines, 50 frames is output from the second converter 21. The two output signals of converters 11 and 21 are respectively supplied to a switching circuit 31. A control signal, which is inverted every 1/50 of a second, is supplied to the switching circuit 31 to cause it to alternate its output between the two input signals. In the interest of brevity and clarity, the control signal for switch 31 is not shown.

Accordingly, a digital luminance signal of 625 lines, 50 fields is output from the switching circuit 31. This digital luminance signal is supplied to a digital-to-analog (D/A) converter 32 and the output signal of D/A converter 32 is supplied to a PAL color encoder 34 through a low-pass filter (LPF) 33. A red color difference signal R-Y and a blue color difference signal B-Y, which have been subjected to the line number converting and field number converting processes just as the luminance signal Y, are also supplied to the PAL color encoder 34. Thus, a compound color television signal of the PAL system is produced on output terminal 35 of the PAL color encoder 34. A color television receiver of the PAL system, not shown, is then connected to output terminal 35.

The operation of field number converter 11 will be set forth hereinbelow. As shown in FIG. 1, it comprises a field memory 13, a movement correcting circuit 14, a linear approximating circuit 15, a switching circuit 16, a misprocess detecting circuit 17, and a memory 18. Second field number converter 21 is exactly the same as first field number converter 11.

Both the digital video signal of the preceding field that is output from field memory 13 and the input digital video signal of the current field that is output from preprocessing circuit 4 are fed to the movement correcting circuit 14, to the linear approximatting circuit 15, and to the misprocess detecting circuit 17. The data of the preceding field of the second field and the data of the current field are also supplied to the movement correcting circuit 14 from the second field number converting circuit 21. Either the output signal of the movement correcting circuit 14 or the output signal of the approximating circuit 15 is selected by the switching circuit 16 in response to a detection signal output from the misprocess detecting circuit 17. The correction output signal from switch 16 is thereby selected to be the correction signal that is the more accurate. The misprocess detection circuit is shown in more detail hereinbelow, However, as shown in FIG. 1 both the signals of the video image of the preceding field of the first field, which had been field shifted and formed in the movement correcting circuit 14, and the signal of the video image of the current field of the first field, which had been field shifted and formed in the movement correcting circuit 14, are supplied to the misprocess detecting circuit 17. Also supplied to the misprocess detection circuit 17 are the original video image of the preceding and current fields of the first field before being fed to the movement correction circuit 14. The selected output of the switching circuit 16 is supplied to a memory 18 that provides time base expansion.

An example of the movement correction that is performed by the movement correcting circuit 14 is shown in FIG. 3 in which F1, F2, F3, F4, F5, and F6 denote six continuous images of the first field. These images include a moving object which performs uniform motion such that it moves a distance v from left to right at every 1/60 of a second. The rate v is actually the movement vector as detected by movement vector detection processing circuit 5. In the case of uniform motion such as this, the sum of the amounts of movement from the image F1 to the image F6 equals 5 v. Therefore, in the case of converting six images, F1 to F6, into five images, f1 to f5, it is necessary to increase the distance of movement by (1/5)v at each field.

As shown by the arrows and their representative values in FIG. 3, the image F1 of the preceding field is not shifted (zero) and the image F2 of the current field which is shifted one full increment (−v) are added, and the resultant added output is divided by two to thereby form the image at field f1. The image f2 is similarly formed from the preceding image F2, which is shifted by (1/5)v and the current image F3, which is shifted by (−4/5)v. The image f3 is formed from the preceding image F3, which was shifted by (2/5)v, and the current image F4, which was shifted by (−3/5)v. The image f4 is formed from the preceding image F4, which was shifted by (3/5)v, and the current image F5, which was shifted by (−2/5)v. The image f5 is formed from the preceding image F5, which was shifted by (4/5)v, and the current F6, which was shifted by (−1/5)v.

An image f6 is also formed from the preceding image F6, which was shifted by v, and the current image F11, which is not shifted (zero). The resultant image f6 is the same as an image f11 of the next field which is formed from the preceding image F11, which is not shifted (zero), and the current image F12 (not shown), which would be shifted by −v. Therefore, the overlapped or redundant image f6 is discarded. Thereafter, the correcting operations represented in FIG. 3 are continuously repeated. From the above and the values represented with the shift arrows in FIG. 3, it is seen that generally the process is to shift the preceding field by (a/5)v and to shift the current field by (−(5−a)/5)v. These shift processes can be executed commonly with the shifting processes which will be needed for the misprocess detection, which will be explained hereinafter.

Although on the one hand the image of the preceding field which was shifted by (a/5)v is essentially the same as the image of the current field which was shifted by (−(5−a)/5)v, by adding these two images and dividing by two the S/N ratio in regard to the random noise in the case of the linear approximation and the S/N ratio in regard to the random noise in the case of the movement correction can be equalized.

If the movement vector is erroneously detected the effect is to produce an unfocused or fuzzy image. In the case of panning or tilt, if the movement vector can be accurately detected, the field number conversion can be completely performed using movement correction as described in relation to FIG. 3. However, if in the actual image there is a portion having various kinds of motions, even in one picture plane, or if there is a portion of the image that is still, there will be problem caused by the image shift. In such a case, the output of the linear approximating circuit 15 is selected by the switching circuit 16 in place of the output of the movement correcting circuit 14.

The linear approximating circuit 15 serves as an interpolating circuit for multiplying predetermined weight coefficients with the continuous video images of two fields, respectively, and adding the resultant multiplied outputs. An example of correction of the linear approximating circuit 15 is described with reference to FIG. 4, in which the images F1 to F6 are six continuous images, which are derived at every (1/60) of a second. These images include both a moving object, which performs the uniform motion, and a still object. Note that there is no uniform motion rate, such as v as there was in the movement correction example explained in FIG. 3. In FIG. 4, the images indicated by broken lines denote the images of the current field, which are also present in the shift field ($f_1, f_2, \ldots$) but which can not be seen due to the integration function of human vision. The first converted image of f1 is set to correspond to the image at F2 and the image f2 is formed by adding the preceding image F2, which was multiplied with the weight coefficient of (4/5) and the current image, which is F3 multiplied with the weight coefficient of (1/5). Similarly, the image f3 is formed by adding (3/5)F3 and (2/5)F4; the image f4 is formed by adding (2/5)F4 and (3/5)F5; and the image f5 is formed by adding (1/5)F5 and (4/5)F6.

The image f6, which is formed from the images F6, and F11 and the image f11, which is formed form the images F11 and F12 (not shown), overlap or are redundant. Therefore, one image (f6) is deleted.

In the linear approximating circuit 15, there occurs the problem such that a double image is produced or the image is blurred or out of focus at its edges with respect to its moving portion. However, with regard to the still portion the correction due to the linear approximation is still better than that provided by the movement correction. Nevertheless, it falls to the misprocess detecting circuit 17 to determine whether the misprocess by the movement correcting circuit 14 has occurred or not.

Figure 5:
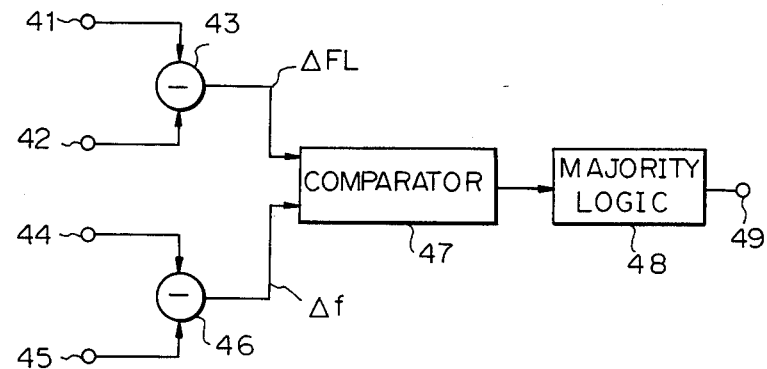
FIG. 5 is a schematic in block diagram form of a misprocess detecting circuit used in the apparatus of FIG. 1.

Referring now to FIG. 5, an example of the misprocess detecting circuit 17 is shown, in which the digital video signal of the preceding field F1 is supplied to a first input terminal 41, and the digital video signal of the current field F2 is supplied to a second input terminal 42. Both of these input digital video signals are subtracted for every pixel in a subtractor 43, so that the difference $\Delta$FL between the signals of both fields is obtained. The signal of the field f11 of which the image of the preceding field F1 was shifted by, e.g., (2/5)v is supplied to a third input terminal 44, and the signal of the next field f12 of which the image of the current field F2 was shifted by, e.g., (−3/5)v is supplied to a fourth input terminal 45. Both digital video signals of these derived, shifted fields f11 and f12 are subtracted for every pixel by a subtractor 46, so that the difference $\Delta$f between the signals of both fields is obtained. The above field numbers are not intended particularly to correlate with the field numbers used in the explanation of FIGS. 3 and 4.

Figure 6:
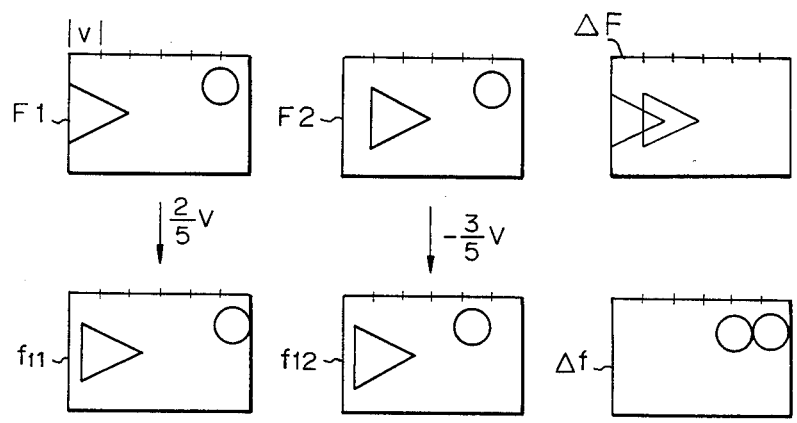
FIG. 6 is a diagrammatic representation useful for explaining the misprocess detection operation of the circuit of FIG. 5.

The difference signals $\Delta$FL and $\Delta$f from subtractors 43 and 46, respectively, are compared in a comparator 47. As shown in FIG. 6, the image of the field f11, which is the image of the preceding field F1 shifted by (2/5)v, and the image of the field f12, which is the image of the current field F2 shifted by (−3/5)v, in this example, are the same with respect to the moving portion, so that the difference image $\Delta$f between both images from subtractor 46 results in an image in which the moving portion is removed. On the other hand, the preceding field F1 and the current field F2 which are not shifted are, nevertheless, the same with regard to the still portion and the result (not shown) of subtractor 44 results in an image in which the still portion is removed. Therefore, by operation of comparator 47, it can be decided that the movement correcting process is correct with respect to the pixel of interest when ($\Delta$FL > $\Delta$f) is detected. On the other hand, it is determined that the movement correction is incorrect with respect to the pixel of interest when ($\Delta$FL < $\Delta$f) is detected.

Comparator 47 generates a comparison output which assumes a high "H" level when (ΔFL>Δf) and a low "L" level when (ΔFL<Δf). This comparison output is supplied to a majority logic circuit 48. The majority logic circuit 48 decides whether highs or lows are in the majority for every detection region of the movement vector. More specifically, in the comparison of the outputs of a plurality of pixels included in one detection region, when the number of comparison outputs at an "H" level is larger than the number of comparison outputs at an "L" level, an output signal at an "H" level is generated at an output terminal 49. On the other hand, when the number of comparison outputs at an "L" level is larger than the number of comparison outputs at an "H" level, an output signal at an "L" level is generated at output terminal 49. This output signal is the control signal fed to switching circuit 16 that selects the correct signal from movement correcting circuit 14 when the output of the misprocess detecting circuit 17 is at an "H" level or, when the output of the detecting circuit 17 is at an "L" level, selects the corrected signal from linear approximating circuit 15.

Both movement correcting circuit 14, provided in field number converter 11 of the first field, and movement correcting circuit (not shown), provided in field number converter 21 of the second field, perform the same essential movement correcting operations as shown in FIG. 3. This movement correction can be effectively accomplished using only one of the signals of the first and second fields. However, in an aspect of this invention, the signals of both of the first and second fields are supplied to the movement correcting circuits, thereby improving the accuracy of the movement correction in the vertical direction by a factor of two.

Figure 7:
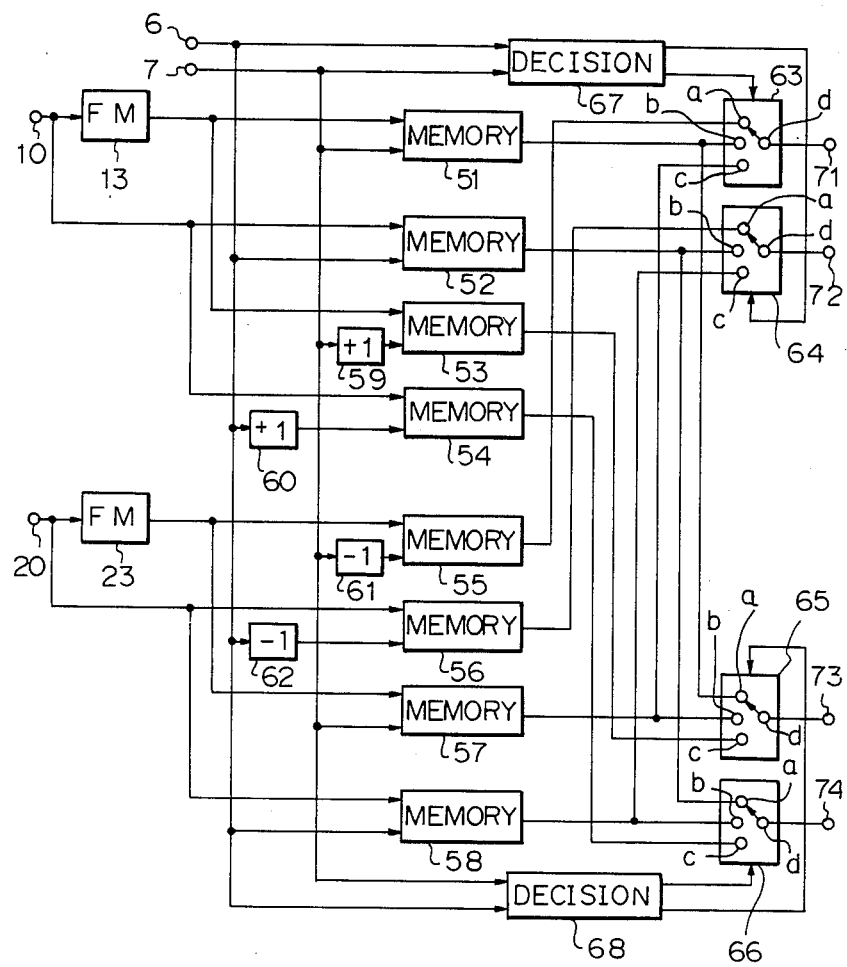
FIG. 7 is a schematic in block diagram form of an embodiment of a movement correcting circuit according to the present invention.

FIG. 7 is a movement correcting circuit according to an embodiment of the present invention, in which the movement correcting circuit for the first field comprises: shift processing memories 51, 52, 53, and 54; shift command change circuits 59 and 60; data selectors 63 and 64; and a decision circuit 67. The movement correcting circuit for the second field comprises: shift processing memories 55, 56, 57, and 58; shift command changing circuits 61 and 62; data selectors 65 and 66; and a decision circuit 68. The shift processing memories operate to shift the image of one field in response to the address control corresponding to the components in the horizontal and vertical directions of the shift command.

The digital video signal of the current field of the first field, as applied at input terminal 10, is supplied to the shift processing memories 52 and 54, and the digital video signal of the preceding field of the first field, derived from field memory 13 also connected to input terminal 10, is supplied to the shift processing memories 51 and 53.

The digital video signal of the current field of the second field, as applied to input terminal 12, is supplied to the shift processing memories 56 and 58, and the digital video signal of the preceding field of the second field, derived from field memory 23 also connected to input terminal 20, is supplied to the shift processing memories 55 and 57.

The shift command relative to the image of the current field is supplied at an input terminal 6, which is one of the outputs of the movement vector detection circuit 5 of FIG. 1. The shift command relative to the image of the preceding field is supplied at an input terminal 7, which is the other of the outputs of the movement vector detection circuit 5 of FIG. 1. These shift commands, as formed by movement vector detection processing circuit 5, are used to perform the movement correction as shown in FIG. 3. Although FIG. 3 shows only the movement correcting operation in the horizontal direction, it should be understood that the shift commands are in the form of (x samples, y lines), that is, they also provide for shifts in the vertical direction. The shift commands regarding the current field are supplied directly to the shift processing memories 52 and 58 and are also supplied through shift command changing circuits 60 and 62 to the shift processing memories 54 and 56, respectively. The shift commands with respect to the preceding fields are similarly supplied directly to the shift processing memories 51 and 57 and are also supplied through shift command changing circuits 59 and 61 to the shift processing memories 53 and 55, respectively.

Both shift command changing circuits 59 and 60 operate to add "1" to the value of the component y in the vertical direction of the shift command, and both shift command changing circuits 61 and 62 operate to subtract "1" from the value of the component y in the vertical direction of the shift command. Therefore, the outputs of memories 53 and 54 are such that the shift amounts are increased by one line by changing circuits 59 and 60. On the other hand, outputs of memories 55 and 56 are such that the shift amounts are decreased by one line by changing circuits 61 and 62.

As an example of the operation of this movement correction circuit, when the signal of the 24th line of the first field is output from shift processing memories 51 and 52, respectively, the signal of the 25th line of the first field is output from the shift processing memories 53 and 54, respectively, and at the same time, the signal of the 337th line that formed the pair with the 24th line is output from the shift processing memories 57 and 58, respectively. The signal of the 336th line is output from the shift processing memories 55 and 56, respectively. Four data selector switches are provided and each of data selectors 63 to 66 has three input terminals a, b, and c and one output terminal d. The shifted output signal of the preceding field of the first field is derived at an output terminal 71 connected to output terminal d of data selector 63, and the shifted output signal of the current field of the first field is derived at an output terminal 72 connected to output terminal d of data selector 64. Data selectors 63 and 64 are controlled by respective control signals form decision circuit 67. The signals at output terminals 71 and 72 are those shown in FIG. 1 as being fed to the misprocess detection circuit 17 and the single output line fed to one input of switch 16 of FIG. 1 is obtained by adding and dividing the two output signals. More specifically, the shifted output signals derived at output terminals 71 and 72 are added together and the resultant signal is reduced by ½, so that the movement correction output signal is obtained. In the interest of brevity and clarity in the drawings, the adder and divide-by-two units are not shown in FIG. 7.

The shift command relative the current field and the shift command relative to the preceding field from terminals 6 and 7, respectively are supplied to decision circuit 67. As described hereinabove, the shift command regarding the current field is derived by multiplying the detected movement vector v by the coefficients (−1, −4/5, −3/5, −2/5, −1/5). Similarly, the shift command relative to the preceding field is obtained by multiplying the detected movement vector v by the coefficients (1/5, 2/5, 3/5, 4/5, 1). Because movement in the vertical direction can only be line to line, the component in the vertical direction of the movement vector v is an integer, and a fraction that is an integer times 1/5 occurs in the shift command. Decision circuit 67 decides the direction and fraction with regard to each of the shift commands of the current and preceding fields and generates a control signal to cause the appropriate data selector 63 or 64 to select the optimum signal.

More specifically, in regard to the shift commands in the vertical direction, the fractions 2/5 and 3/5 are counted as 0.5, the fraction 1/5 is discarded, and the fraction 4/5 is increased to 1. These discarding and increasing processes are executed in shift processing memories 51 to 54, respectively, whereas the process of converting to the fraction of 0.5 is performed in the decision circuit 67. In addition, when the shift command has a positive (+) sign, the shift direction is determined to be downward and when the shift command has a negative (−) sign, the shift direction is determined to be upward.

In regard to the inputs of data selector 63, the output of memory 55 is supplied to input terminal a for generating the shifted output of the proceding field, the output of memory 51 is supplied to input terminal b and the output of memory 57 is supplied to input terminal c. In regard to the inputs of data selector 64, the output of memory 56 is supplied to input terminal a for generating the shifted output of the current field, the output of memory 52 is supplied to input terminal b, and the output of memory 58 is supplied to input terminal c.

Thus, as an example of the operation of this system, when the signals of the 24th lines of the preceding and current fields are supplied to input terminals b of data selectors 63 and 64, the signals of the 336th lines of the preceding and current fields will be supplied to input terminals a of data selectors 63 and 64, and the signals of the 337th lines of the respective fields are supplied to input terminals c of data selectors 63 and 64.

Therefore, when an upward shift of 0.5 line is determined by decision circuit 67, each output terminal d of data selectors 63 and 64 is connected to input terminal a. On the other hand, when a downward shift of 0.5 line is determined, each output terminal d of data selectors 63 and 64 is connected to input terminal c and when the shift of an integral number of lines is decided, each output terminal d of data selectors 63 and 64 is connected to input terminal b.

Data selectors 65 and 66 that are provided relative to second field operate in a manner similar to data selectors 63 and 64 with respect to the first field. More specifically, the output of memory 51 is supplied to input terminal a of data selector 65 for generating the shifted output of the preceding field, the output memory 57 is supplied to input terminal b, and the output of memory 53 is supplied to input terminal c. The output of memory 52 is supplied to input terminal a of data selector 66 for generating the shifted output of the current field, the output of memory 58 is supplied to input terminal b. and the output of memory 54 is supplied to input terminal c.

Each of the data selectors 65 and 66 selects the signal of the upper or lower line adjacent to the line of the signal to be supplied to the input terminal b in accordance with the control signal from decision circuit 68, thereby shifting the image in the vertical direction by 0.5 line.

Figure 8:
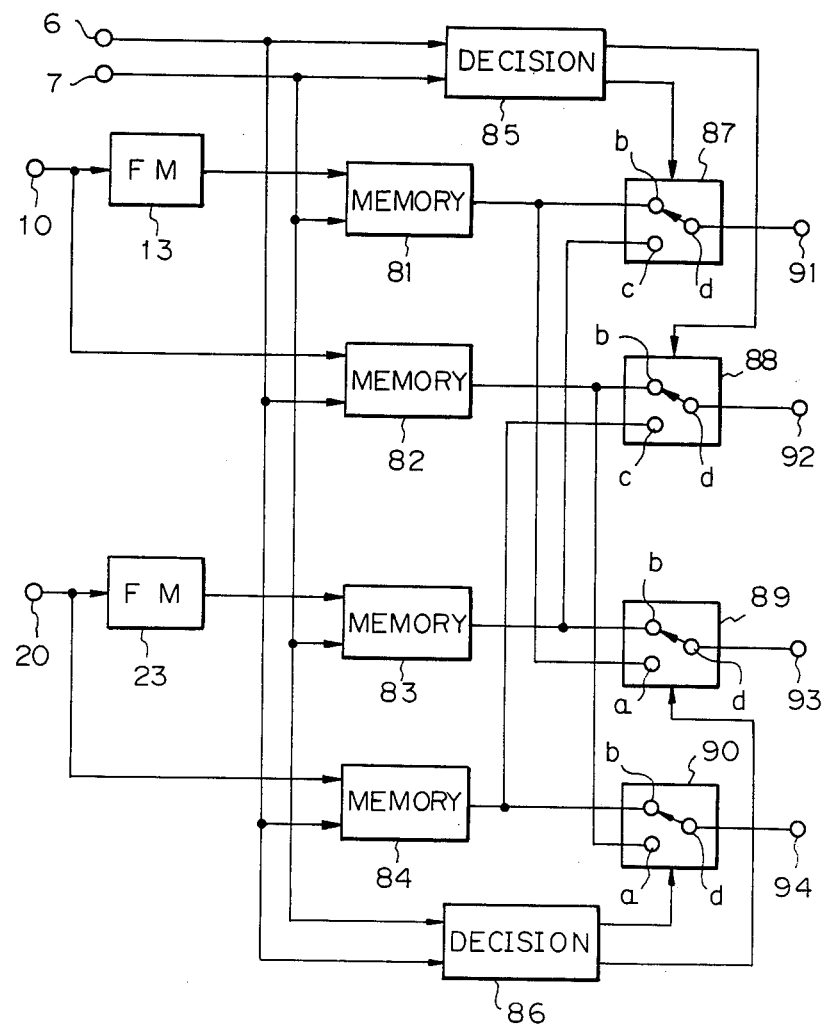
FIG. 8 is a schematic in block diagram form of another embodiment of a movement correcting circuit according to the present invention.

FIG. 8 is another embodiment of a movement correcting circuit according to the present invention, in which the shift processing memories 53 to 56 in the movement correcting circuit of FIG. 7 are removed and shift processing memories 81 to 84 respectively corresponding to the shift processing memories 51, 52, 57, and 58, which are inherently necessary to shift the image, are used.

Outputs of memories 81 and 82 are supplied to input terminals b of data selectors 87 and 88 and outputs of memories 83 and 84 are supplied to input terminals c of data selectors 87 and 88. Data selectors 87 and 88 are controlled by control signals which are formed by a decision circuit 85. When the downward shift of 0.5 line is determined to be necessary, input terminals c of data selectors 87 and 88 are connected to output terminals d, so that the shifted output signals of the first field are obtained at output terminals 91 and 92. These outputs are treated in the same fashion as the outputs at terminals 71 and 72 of FIG. 7.

Outputs of memories 83 and 84 are supplied to input terminals b of data selectors 89 and 90 relative to the signal of the second field and outputs of memories 81 and 82 are supplied to input terminals of data selectors 89 and 90, respectively. Data selectors 89 and 90 are controlled by control signals which are formed by a decision circuit 86. When the upward shift of 0.5 line is determined to be necessary, the input terminals a and output terminals d of data selectors 89 and 90 are connected, respectively. The shifted output signals of the second field are derived at output terminals 93 and 94. These outputs are treated in the same fashion as the outputs at 73 and 74 of FIG. 7.

Because the embodiment of the movement correcting circuit of FIG. 8 is limited to a shift in only a single direction, improvement in accuracy by a factor of two, which was obtained with the movement correcting circuit of FIG. 7, is not possible. Nevertheless, there is a very good possibility that the accuracy in the vertical direction can be improved 1.5 times.

The present invention is not limited to the field number converting apparatus in the system conversion from the HDTV system to the PAL system but can be also applied to the system conversion from the HDTV system to the SECAM system, band compression transmission, and the like.

According to the present invention, by using signals of first and second fields that are simultaneously derived from the same field and that are vertically shifted by 0.5 line relative to each other, the image shift amount of 0.5 line can be realized, without setting the image shift amount in the vertical direction to an integer line and counting fractions over 0.5 as one and disregarding the rest, as in the conventional manner. Consequently, the accuracy of the movement correction in the vertical direction can be improved 1.5 or 2 times as compared with the conventional accuracy. In particular, a smooth output image can be formed by applying the present invention to the processing of a moving image which moves at a slow speed.

The above description is provided for a single preferred embodiment of the invention, however, it will be apparent that many modifications and variations could be effected by one skilled in the art without departing from the spirit or scope of the novel concepts of the invention, which should be determined only by the appended claims.

What is claimed is:

1. Apparatus for correcting movement of a television signal picture image in a vertical direction, comprising:

means for detecting movement of a picture image between successive fields of a television signal and producing a vector signal indicating a magnitude and a direction of said detected movement;

first memory means for storing a first field of the television signal therein;

second memory means for storing a second field of the television signal therein; and switching means for selecting the stored first and second fields of the television signal from said respective first and second memory means in response to said vector signal;

in which said first memory means comprises a first field memory for delaying the television signal for an interval of at least one field to produce the television signal in the preceding first field and a first pair of memories for respectively storing the data in the same line of the current and preceding first fields.

2. Apparatus according to claim 1 in which said second memory means comprises a second field memory for delaying the television signal for an interval of at least one field to produce the television signal in the preceding second field and a second pair of memories for respectively storing the data in the same line of the current and preceding second fields.

3. Apparatus according to claim 1 in which the current field and the preceding field are formed of lines and said first memory means further comprises a third pair of memories for respectively storing the data in the lines of the current field and the preceding field adjacent to the lines from which the data stored in said first pair of memories is produced.

4. Apparatus according to claim 3 in which the adjacent lines from which the data stored in said third pair of memories is produced comprise spatially downward lines relative to a field of the television signal.

5. Apparatus according to claim 2 in which said switching means comprises a first switch for selecting an output of one of said first pair of memories and an output of one of said second pair of memories, and a second switch for selecting an output of the other of said first pair of memories and an output of the other of said second pair of memories.

6. Apparatus according to claim 5 in which said switching means further comprises a third switch for selecting said output of said one of said second pair of memories and said output of said one of said first pair of memories and a fourth switch for selecting said output of said other of said first pair of memories and said output of said other of said second pair of memories.

7. Apparatus according to claim 2 in which said second memory means further comprises a fourth pair of memories for respectively storing the data in the lines of the present field and preceding field adjacent to the lines from which the data stored in each second pair of memories.

8. Apparatus according to claim 7 in which the adjacent lines from which the data stored in said fourth pair of memories comprise spatially upward lines relative to a field of the television signal.

9. An apparatus according to claim 2 in which said switching means comprises a first switch for selecting an output of one of said first pair of memories and an output of one of said second pair of memories, and a second switch for selecting an output of the other of said first pair of memories and an output of the other of said second pair of memories.

10. Apparatus according to claim 9 in which said switching means further comprises a third switch for selecting said output of said one of said second pair of memories and said output of said one of said first pair of memories and a fourth switch for selecting said output of said other of said first pair of memories and said output of said other of said second pair of memories.

11. Apparatus according to claim 9, in which said first pair of memories stores, respectively, the data in the same line of the current first field and the preceding first field for reading out same to said second switch in response to said vector signal having been passed through means for shifting said vector signal to increase a value thereof.

12. Apparatus according to claim 11 in which said second pair of memories stores, respectively, the data in the same line of the current second field and the preceding second field for reading out same to said first switch in response to said vector signal having been passed through means for shifting said vector signal to decrease a value thereof.

13. Apparatus according to claim 9 in which said first pair of memories stores, respectively, the data in the same line of the current first field and the preceding first field for reading out same to said second switch in response to said vector signal having been passed through means for shifting said vector signal to increase a value thereof.

14. Apparatus according to claim 13 in which said second pair of memories stores, respectively, the data in the same line of the current second field and the preceding second field for reading out same to said first switch in response to said vector signal having been passed through means for shifting said vector signal to decrease a value thereof.

* * * * *

UNITED STATES PATENT AND TRADEMARK OFFICE
CERTIFICATE OF CORRECTION

PATENT NO. : 4,731,651

DATED : March 15, 1988

INVENTOR(S) : Kunio Matsumoto et al.

Page 1 of 2

It is certified that error appears in the above-identified patent and that said Letters Patent are hereby corrected as shown below:

Column 4, line 34, change "approximatting" to --approximating--.

Column 8, line 51, after "17" insert --,--.

Column 9, line 58, change "b." to --b,--.

Column 10, line 59, change ", however," to --. However,--.

IN THE CLAIMS

Column 11, line 20, after "claim 1" insert --,--;

Column 11, line 27, after "claim 1" insert --,--;

Column 11, line 34, after "claim 3" insert --,--;

Column 11, line 38, after "claim 2" insert --,--;

Column 11, line 45, after "claim 5" insert --,--.

Column 12, line 1, after "claim 2" insert --,--;

Column 12, line 7 after "claim 7" insert --,--;

Column 12, line 11, after "claim 2" insert --,--;

Column 12, line 18, after "claim 9" insert --,--;

Column 12, line 32, after "claim 11" insert --,--;

Column 12, line 39, after "claim 9" insert --,--;

UNITED STATES PATENT AND TRADEMARK OFFICE
CERTIFICATE OF CORRECTION

PATENT NO. : 4,731,651
DATED : March 15, 1988
INVENTOR(S) : Kunio Matzumoto et al It is certified that error appears in the above-identified patent and that said Letters Patent is hereby corrected as shown below:

Column 12, line 46, after "claim 13" insert --,--.

Signed and Sealed this

Eighth Day of November, 1988

Attest:

DONALD J. QUIGG

Attesting Officer

Commissioner of Patents and Trademarks